US005639055A

United States Patent [19]

Fritz

[11] Patent Number: 5,639,055
[45] Date of Patent: Jun. 17, 1997

[54] CRUTCH STAND

[76] Inventor: Robert H. Fritz, 1209 E. Pine St., Alvin, Tex. 77511

[21] Appl. No.: 429,815

[22] Filed: Apr. 27, 1995

[51] Int. Cl.[6] .......... F16M 13/00

[52] U.S. Cl. .......... 248/519; 248/176.1; 248/910

[58] Field of Search .......... 248/512, 519, 248/158, 346.01, 346.03, 346.11, 346.2, 910, 176.1; 211/60.1, 69.5, 62, 70.6

[56] References Cited

U.S. PATENT DOCUMENTS

| | | | |
|---|---|---|---|
| 3,574,498 | 4/1971 | Zarinsky | 248/512 X |
| 3,661,270 | 5/1972 | Lucci et al. | 211/62 |
| 3,905,324 | 9/1975 | English | 248/512 X |
| 4,300,742 | 11/1981 | Hunn | 248/360 |
| 4,534,474 | 8/1985 | Ng | 211/70.7 X |
| 5,087,012 | 2/1992 | Doublet | 248/519 X |
| 5,112,023 | 5/1992 | Sowers | 248/910 X |
| 5,427,346 | 6/1995 | Urgola | 248/910 X |
| 5,456,437 | 10/1995 | Chander et al. | 211/62 X |

FOREIGN PATENT DOCUMENTS

| | | | |
|---|---|---|---|
| 994741 | 8/1976 | Canada | 248/910 |

*Primary Examiner*—Korie Chan
*Attorney, Agent, or Firm*—Wheat, Camoriano, Smith & Beres PLC

[57] ABSTRACT

A crutch stand for the temporary storage of a crutch in an upright position includes a base and upwardly-projecting crutch receivers. The base of the crutch stand preferably is hollow and can receive sand, water, or another fluid to provide stability to the stand. This permits the stand to be shipped in a lightweight form and then to become heavier for use.

4 Claims, 4 Drawing Sheets

CRUTCH STAND

BACKGROUND OF THE INVENTION

The present invention relates to a stand for supporting crutches in an upright position.

When a person using crutches sits in a chair, it is common practice for the person to lean the crutches up against some nearby convenient support. People who find it necessary to utilize the assistance of crutches for their mobility are often unable to retrieve a crutch from the floor if a crutch falls on the floor. This is especially true for people who have undergone hip joint replacements, as the angle between their chest and thigh is never to be less than 90 degrees until the joint has sufficiently healed. Crutches lying on the floor can present a safety hazard in that someone might trip over the crutches. In addition, the continued leaning of a crutch against a wall or other surface eventually damages that surface.

In the past, attachments have been put on crutches and canes to make them self-supporting. The disadvantage with these prior art supports is that they must be carried with the crutch. This increases the weight of the crutch and is inconvenient, in that the attachments can catch on people's clothing, hit doorways, and so forth when the crutch or cane is in use. Other types of stands, such as umbrella stands and Christmas tree stands, are known, but they are not very well-suited for holding crutches.

SUMMARY OF THE INVENTION

It is an object of the present invention to provide a convenient and stable crutch stand that does not have to be carried along with the crutch.

It is another object of the present invention to provide a crutch stand that is inexpensive so one or more stands can be purchased by most people who need them and can be easily positioned at strategic places in a residence or clinic.

It is another object of the present invention to provide a crutch stand in which the combined center of gravity of the crutch and stand is low enough to maintain the crutch in a stable, upright position, giving maximum resistance to overturning and minimum obstruction to passersby.

DESCRIPTION OF THE PREFERRED EMBODIMENT

Figure 1:
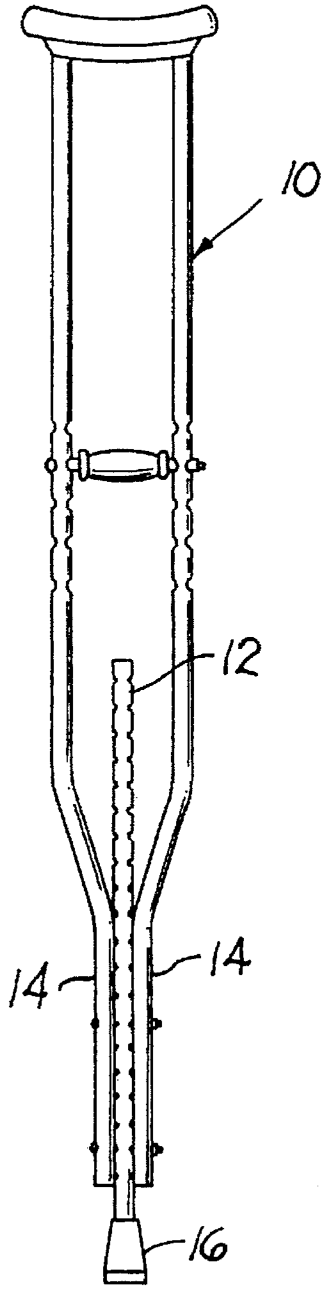
FIG. 1 PRIOR ART
FIG. 1 is an example of a prior art crutch of the general type which is intended to be received by the crutch stand of the present invention.

FIG. 1 illustrates a standard type of prior art crutch 10. This crutch 10 is made so that it allows the user to alter the length of the crutch to personalize the fit. The middle tube 12 of the crutch 10 can be adjusted up or down to shorten or lengthen the crutch 10. FIG. 1 shows the middle tube 12, the outer tubes 14, and the tip 16 of the crutch 10.

Figure 2:
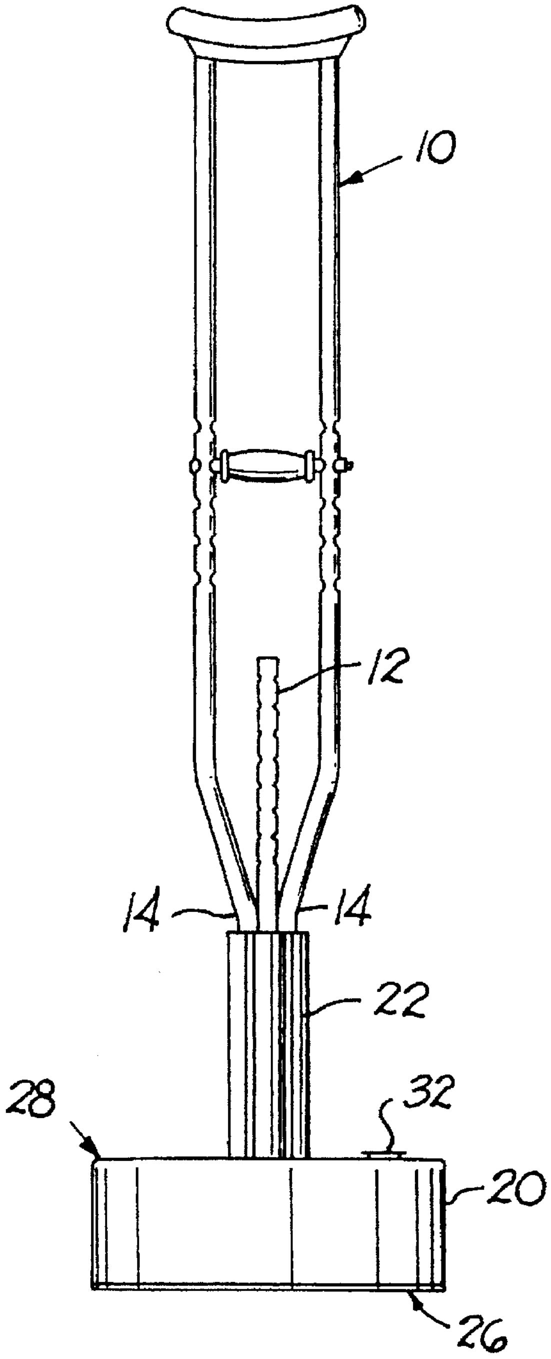
FIG. 2 is a side view of a crutch stand made in accordance with the present invention, with the crutch of FIG. 1 inserted into the stand.
Figure 7:
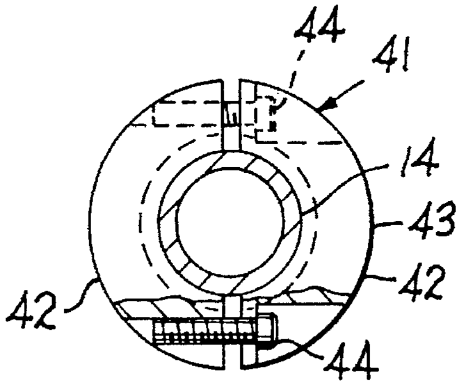
FIG. 7 is a top view of what is shown in FIG. 6.
Figure 6:
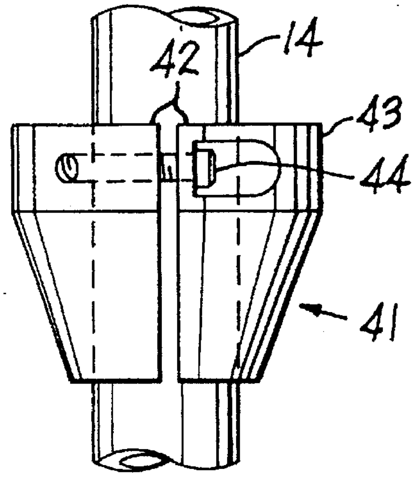
FIG. 6 is a broken-away side view of the crutch of FIG. 1, with an attachment added to the crutch.
Figure 2A:
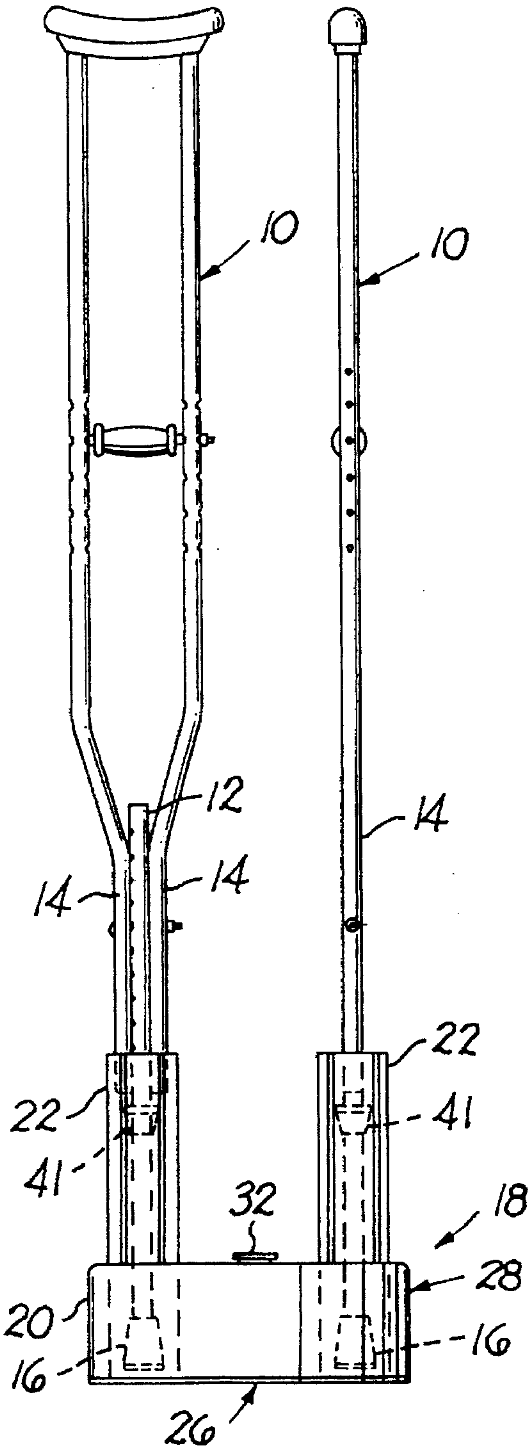
FIG. 2A is a front view of the crutch stand of FIG. 2.

FIG. 2 shows the prior art crutch 10 being received in a crutch stand 18 made in accordance with the present invention. The crutch stand 18 includes a weighted base portion 20 and two upwardly-extending crutch-receiving portions 22, only one of which is seen in this view, because the other crutch-receiving portion 22 is directly behind the one that is shown here.

Figure 3:
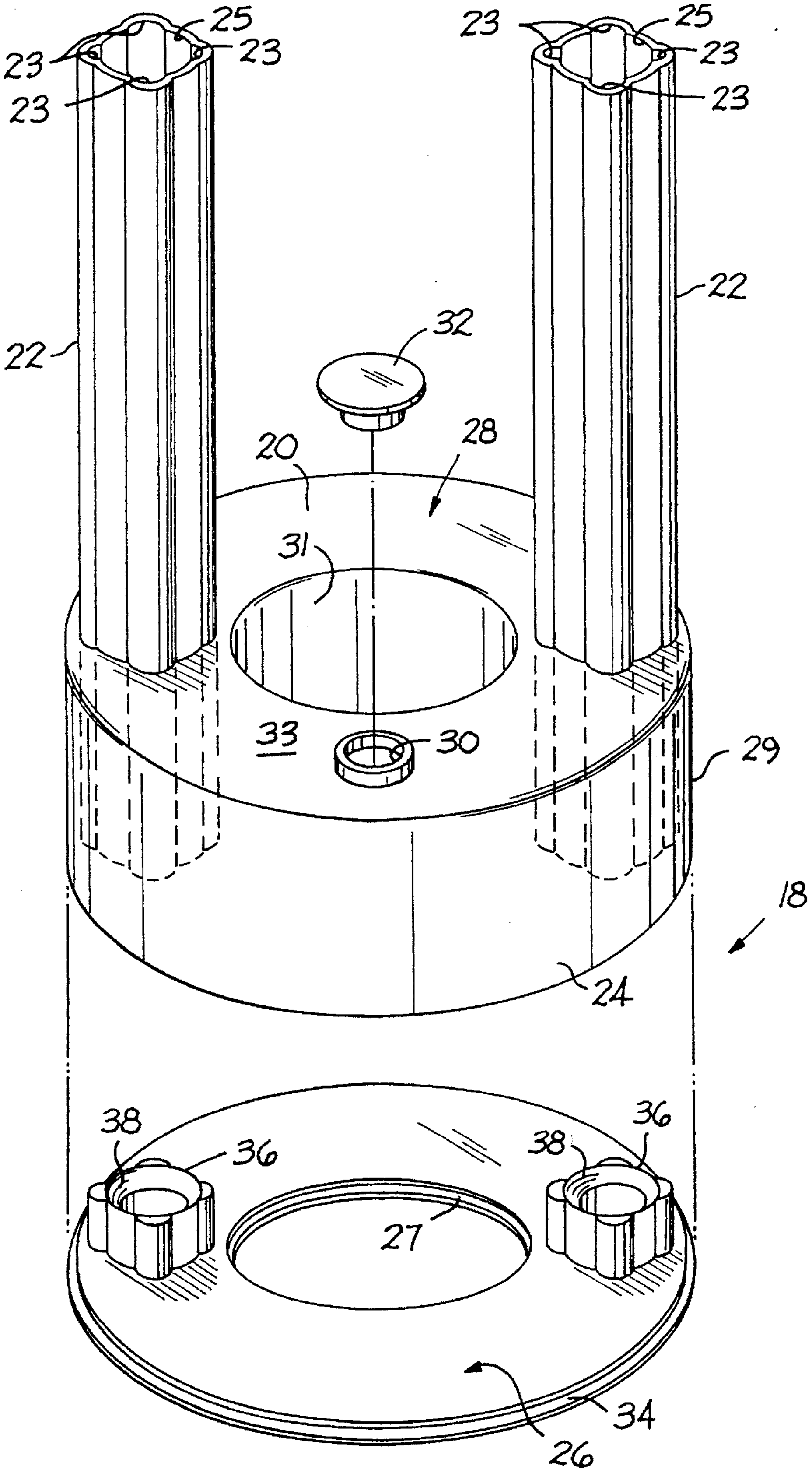
FIG. 3 is an exploded perspective view of the crutch stand of FIG. 2.

FIGS. 2A through 5 show more details of the crutch stand 18. FIG. 3 shows that the crutch stand 18 is preferably made of two molded plastic pieces, an upper piece 24, and a base plate 26.

The upper piece 24 includes the top portion 28 of the hollow base 20, which has an outer wall 29, an inner wall 31, and a top wall 33, forming a toroid or doughnut shape. The top wall 33 of the upper piece 24 also includes a fill port 30 with a cap 32.

Figure 4:
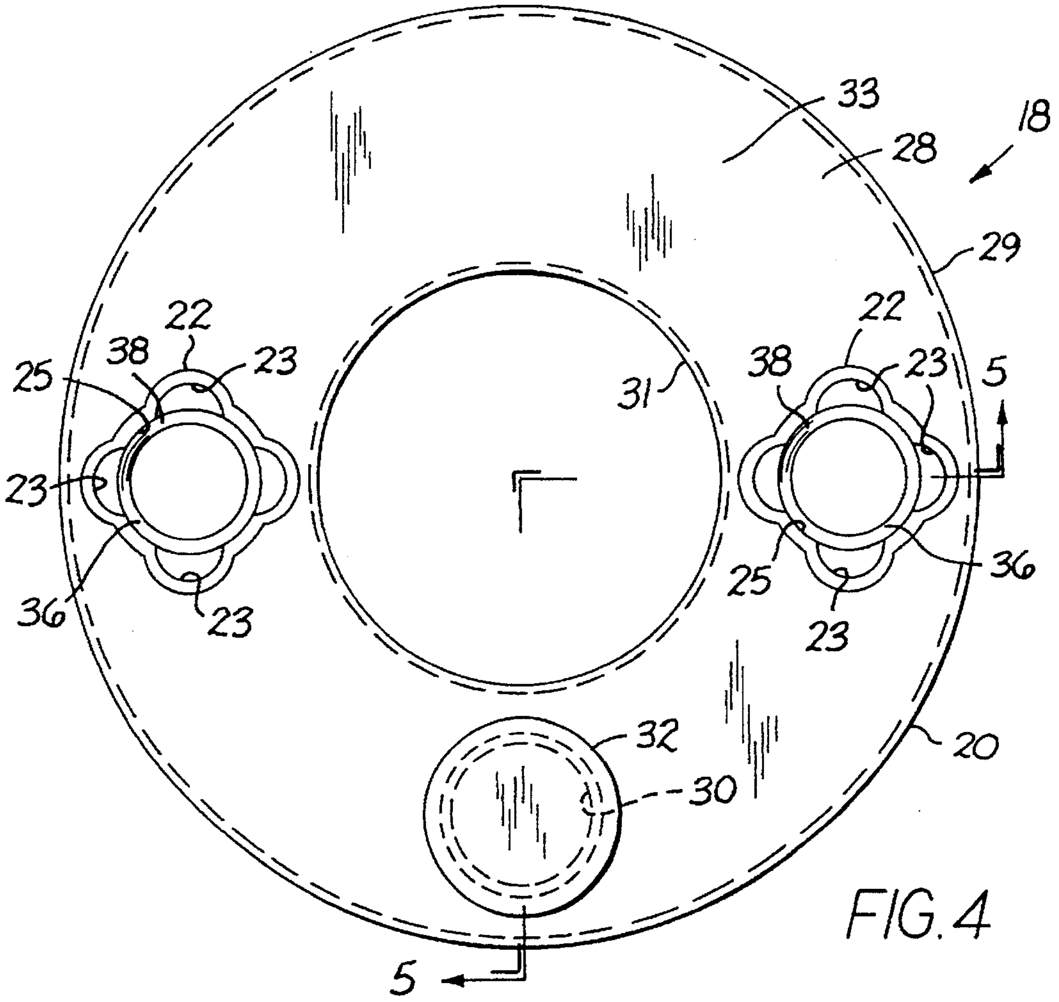
FIG. 4 is a top view of the crutch stand of FIG. 2.
Figure 5:
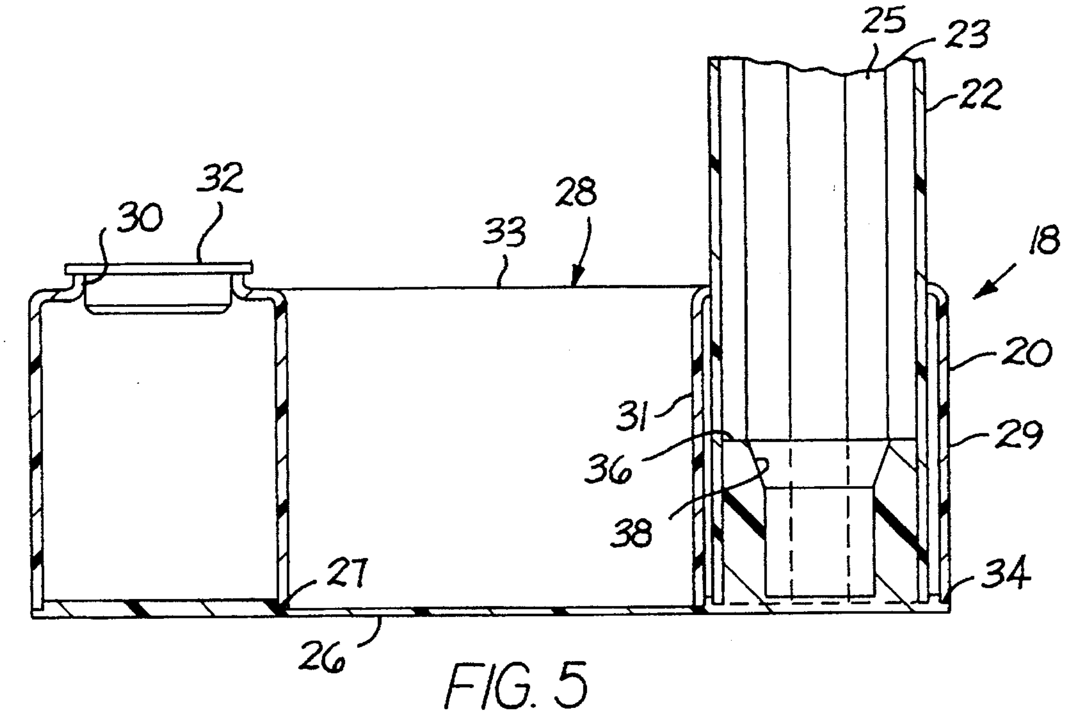
FIG. 5 is a view taken along the section 5—5 of FIG. 4.

Two opposed crutch receivers 22 are an integral molded part of the upper piece 24 and define openings in the top wall 33 of the stand between the inner and outer walls 31, 29. As can be seen in FIG. 4, the crutch receivers 22 are made with two pairs of opposed ears 23 or semi-tubular members projecting from a circular cross-section central portion 25, having a tubular shape. Each pair of opposed ears 23 is sized to receive the outer tubes 14 of a crutch 10 so as to prevent the crutch from turning once it has been received by the stand. The stand would work well with only one pair of opposed ears 23, but it is thought that two pairs of ears 23 per crutch receiver 22 are preferable, because, with two pairs of opposed ears 23, the person using the crutch stand need never turn the crutch more than 90° in order to align it with one pair of opposed ears so it can be received in the stand 18.

The base plate 26 is essentially a flat circular piece with an indentation 34 around its top outer edge and a circular groove 27 in its top surface. The indentation 34 and groove 27 permit the base plate 26 to mate with the upper piece 24. The indentation 34 on the base plate 26 receives the outer wall 29 of the upper piece 24, and the groove 27 on the base plate 26 receives the bottom of the inner wall 31. The bottom edges of the crutch receivers 22 are also sealed against the base plate 26. Located on the base plate 26 opposite each crutch receiver 22 is a crutch centerer 36 projecting upwardly from the base plate 26. The crutch centerers 36 are axially aligned with their respective crutch receiver 22. The crutch centerers 36 have a tapered inside diameter as shown in FIG. 3 to facilitate receiving the tip 16 of the crutch 10. The inside diameter of the centerers 36 is slightly larger than the diameter of the standard crutch tip 16.

When a crutch is at its minimum vertical height, the outer tubes 14 of the crutch will extend into the crutch stand and will be in maximum contact with the crutch receiver 22. At this position, maximum support will be given to the crutch. When a crutch is at its maximum vertical height, the outer tubes will not extend as far into the crutch stand, so they will be in minimum contact with the crutch receiver. At this position, shown in FIG. 2A, an attachment 41 is added to the crutch to provide the necessary support.

The crutch attachment 41 is made up of two pieces 42 which are held together and pressed against the center tube 12 by means of set screws 44. The attachment 41 has a tapered outer surface, tapering from a small diameter in its lower portion to a larger diameter in its upper portion. The large diameter portion 43 of the attachment is only slightly smaller than the diameter of the circular cross-section portion 25 of the crutch receiver 22, so it contacts the inner surface of the crutch receiver 22 to provide the necessary support to the crutch. The attachment 41 can be placed at any desired position on the center tube 12 in order to provide the best support. Since the attachment 41 is small and lightweight, it does not interfere with the use of the crutch.

The crutch centerer 36, on the base plate 26, receives the tip 16 of the crutch 10, so, between the contact with the centerer 36 and the contact with the crutch receiver 22, the crutch is well-supported in the stand, keeping the crutch in a nearly vertical position.

This design, in which the crutch receivers 22 are located on opposite sides of the stand 18, provides good stability. Casters (not shown) may be added to the base to make it readily movable. However, it is anticipated that the stands 18 will be inexpensive enough that it will be more desirable to buy a few of them and place them at different locations in a home rather than to move them from place to place.

Assembly and installation of the crutch stand is as follows:

The crutch stand 18 is intended to be assembled in the factory by bonding together the upper piece 24 and the base plate 26 to form a stand with a closed, hollow, toroidal shape, which is interrupted by two islands formed by the crutch receivers 22. Since the crutch receivers 22 and the upper piece 24 are sealed against the base plate, the base portion 20 of the stand 18 can be filled with water or sand or some other handy, heavy material to make the stand stable. This is intended to be done by the purchaser by pouring the heavy material through the fill port 30 so the stand 18 will be lightweight for shipping but will have a heavy, stable base in use.

It will be obvious to those skilled in the art that modifications may be made to the embodiment described above without departing from the scope of the present invention.

What is claimed is:

1. A crutch stand, comprising:

a hollow base, including a bottom wall and a side wall and defining a sealed, hollow interior;

a fill port in said base for adding a weighty material into the hollow interior of said base; and at least two substantially vertical receptacles in said base, sealed off from said hollow interior, said receptacles projecting upwards from said base and each receptacle defining a tube having a length and at least one pair of opposed semi-tubular receivers connected to said tube and extending for the major portion of the length of said tube, such that a crutch can be received in said receptacle, with the sides of the crutch extending into the opposed semi-tubular receivers.

2. A crutch stand as recited in claim 1, wherein sockets are provided on the bottom wall of the base in axial alignment with the receptacles for centering crutch tips inserted therein, each of said tubes having an inside diameter, and each of said sockets having an inside diameter smaller than the inside diameter of its respective tube.

3. A crutch stand, comprising:

a base sealed so as to retain a fluid and having a hollow toroidal shape, defining a center opening;

a fill port on said base for adding a weighty fluid material to said base; and at least two receptacles in said base, located on opposite sides of the center opening and projecting upwardly from said base, for receiving crutches.

4. A crutch stand as recited in claim 1 in combination with a crutch received in one of said receptacles.

* * * * *